United States Patent

Tanaka et al.

[11] 4,332,840
[45] Jun. 1, 1982

[54] COATING METHOD

[75] Inventors: Yasunori Tanaka; Shinji Noda; Hiroshi Chikamasa, all of Odawara, Japan

[73] Assignee: Fuji Photo Film Co., Ltd., Kanagawa, Japan

[21] Appl. No.: 171,509

[22] Filed: Jul. 23, 1980

[30] Foreign Application Priority Data

Jul. 23, 1979 [JP] Japan .................................. 54-93545

[51] Int. Cl.³ .............................................. B05D 5/12
[52] U.S. Cl. .................................... 427/130; 427/128; 427/131
[58] Field of Search .............................. 427/128–131, 427/48

[56] References Cited

U.S. PATENT DOCUMENTS 4,038,442 7/1977 Utumi ................................. 427/128

Primary Examiner—Bernard D. Pianalto
Attorney, Agent, or Firm—Sughrue, Mion, Zinn, Macpeak and Seas

[57] ABSTRACT

Method and apparatus for coating a web with a magnetic coating liquid in which the coating is applied exceedingly uniformly. The web to be coated is continuously transported past a nozzle in an extrusion-type coating unit with the magnetic coating liquid discharged through the nozzle and wherein:

(a) $V_0 > 0.3$ m/sec,
(b) 3 m/sec $> V_1 > 0.1$ m/sec,
(c) $3 > V_1/V_0$, and
(d) 15 cm $> d > 0.2$ cm where $V_0$ is the coating liquid discharge speed at the nozzle of the extrusion-type coating unit, $V_1$ is the coating liquid striking speed at the surface of the web, and d is the distance between the nozzle and the surface of the web.

12 Claims, 3 Drawing Figures

COATING METHOD

BACKGROUND OF THE INVENTION

The present invention relates generally to an improved coating method. More particularly, the invention relates to a method for coating, uniformly and at high speed, a belt-shaped support member or "a web" which is run continuously with a coating liquid such as for the manufacture of magnetic tape.

In the manufacture of magnetic tapes, a gravure coating method, a reverse roll coating method, a doctor knife coating method and an extrusion coating method have been extensively employed for coating webs with magnetic coating liquids. The coating liquid used in manufacturing magnetic tape has a relatively high density as it is a mixture of ferromagnetic material and a polymer binder and, if necessary, an additive. Accordingly, the coating liquid is thixotropic and has a high viscosity having a coefficient of viscosity of at least 2 poises measured with a commercially available Brookfield viscometer. Such a coating liquid has a special characteristic that, if it is not continuously sheared to a certain degree, its viscosity will increase and the liquid tends to form condensates. A more important consideration is that the coating liquid, which is troublesome to handle, must be applied to a web which is generally extremely thin, typically several microns to several tens of microns.

Accordingly, to coat a thin web with thixotropic coating liquid according to any one of the above-described conventional coating methods, the coating operation requires a complex technique. In addition, if the web transport speed is increased, for instance, to a speed higher than about 120 m/min in order to improve productivity, then yet further difficulties are encountered. Thus, it is rather difficult to coat a thin web with a coating liquid using the conventional coating methods.

Japanese Laid-Open Patent Application No. 84242/1977 disclosed a reverse roll system coating method. In the method therein disclosed and as shown in FIG. 1, a coating liquid 3 is applied through the nozzle 2 of an extrusion-type coating unit 1 to the surface of a coating roll 5 which is rotated in a direction opposite to the direction of movement of a web 4 which is transported continuously. Thereafter the thickness of the coating liquid 3 on the coating roll 5 is adjusted to a preferred value by a metering roll 6 which is rotated in a direction opposite to the direction of rotation of the coating roll 5. Then, the coating liquid is transferred onto the web 4 the rear surface of which is supported by a backing roll 7. The thickness of the coating liquid on the web is again adjusted and the coated film is smoothed as the web passes through the gap between a doctor backing roll 8 and a doctor blade 9.

In coating a web with the coating liquid according to the reverse roll system coating method described above the following problems arise:

(i) The web 4 is transported while being sandwiched between the coating roll 5 and the backing roll 7 which turn in opposite directions. If the speed of the web or one or both of the rolls is increased, the tension on the web upstream will be different from that on the web downstream as a result of which the web is creased longitudinally making the thickness of the coated web extremely non-uniform.

(ii) By the action of a centrifugal force, the coating liquid on the coating roll 5 has a tendency to splash in drops and to stick to the surface of the web.

(iii) As a plural rolls must be provided in the coating section, the device is intricate in construction and accordingly maintenance thereof is difficult.

Another extrusion-type coating method was disclosed in Japanese Laid-Open Patent Application No. 11575/1978. According to that method, coating liquid for a magnetic recording material is coated over the surface of a web which is floatingly supported by a fluid with the speed at which the liquid strikes the web being above a predetermined value.

In this second conventional method, the construction of the coating section was considerably simplified and therefore the difficulties described in paragraphs (i) through (iii) can be eliminated. However, the latter method is still disadvantageous in that it is difficult to floatingly support the thin web and the transport of the web is made unstable when the speed is increased with the result that it is considerably difficult to uniformly coat the web at a high speed.

Accordingly, an object of the invention is to provide a coating method in which all of the above-described difficulties accompanying a conventional coating method have been eliminated and with which a web can rapidly be coated with coating liquid with the quality of the coated film maintained high.

SUMMARY OF THE INVENTION

The foregoing object and other objects of the invention have been achieved by the provision of a method of coating a continuously transported web with a magnetic coating liquid using an extrusion-type coating unit in which, according to this invention, the web is coated under the following conditions:

(a) $V_0 > 0.3$ m/sec
(b) $3 \text{ m/sec} > V_1 > 0.1$ m/sec
(c) $3 > V_1/V_0$
(d) $15 \text{ cm} > d > 0.2$ cm where $V_0$ is the coating liquid discharge speed, $V_1$ is the coating liquid striking speed onto the surface of the web, and d is the distance between the nozzle and the surface of the web.

The speed $V_1$ at which the coating liquid dicharged through the nozzle strikes the surface of the web and the distance d between the nozzle and the surface of the web in the extrusion system coating have been individually investigated and the effect of varying these parameters is known in the art. However, the applicant is aware of no prior art in which, as in the invention, the coating liquid discharge speed $V_0$ is taken into account. Moreover, the prior art contains no suggestion that the above-described three parameters $V_0$, $V_1$ and d, are factors which have an effect on the high speed coating operations.

DESCRIPTION OF THE PREFERRED EMBODIMENTS

Figure 1:
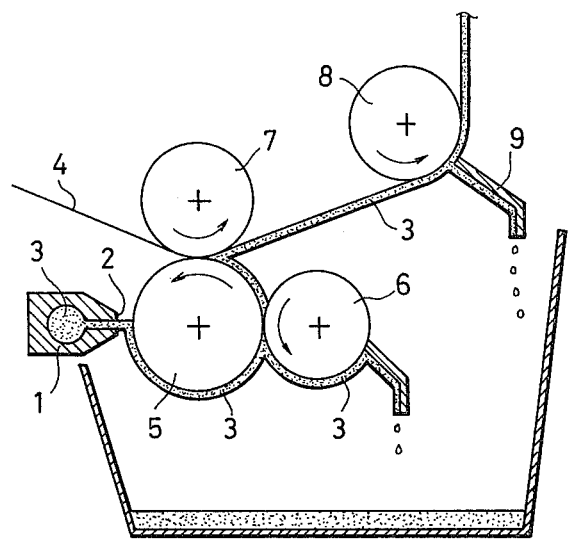
FIG. 1 is an explanatory diagram for a description of a conventional coating method.
Figure 2:
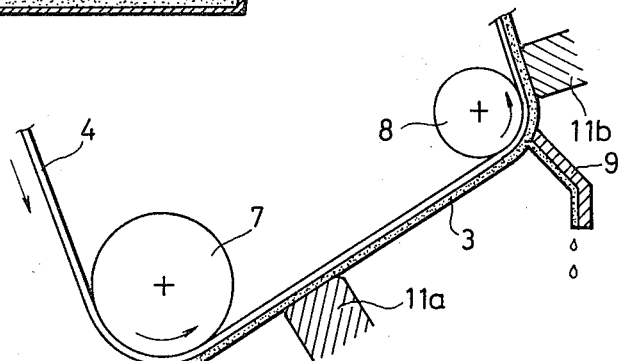
FIG. 2 is a schematic sectional view showing the structure of a preferred embodiment of a coating device according to the invention.

FIG. 2 is a schematic side view showing the structure of a magnetic material coating device according to a preferred embodiment of the invention. As illustrated, the device is used in the manufacture of magnetic tape although the invention is not limited to such a use. A web 4 is transported continuously at high speed. When the web 4 passes over a backing roll 7, it is coated with a magnetic coating liquid 3. The coating liquid 3 is supplied into a liquid pool 10 in a coating unit 1 and is then discharged through a nozzle 2 at a predetermined speed as will be described below. The web 4 after being initially coated with the coating liquid passes over a doctor backing roll 8 at which excessive amounts of coating liquid 3 are removed from the web 4 by a doctor blade 9 which confronts the doctor backing roll 8. A smoother 11a for smoothing the film coated on the web is positioned between the backing roll 7 and the doctor backing roll 8. A second smoother 11b is provided downstream of the doctor backing roll 8 to smooth the coated film after the coating thickness has been adjusted by the doctor blade 9. The smoother 11a or 11b may be a solid smoother such as that disclosed in Japanese Laid-Open Patent Application No. 8646/1979. The solid smoother is made of a material which is inactive with respect to the coating liquid such as a metal such as stainless steel or carbon steel, an alloy such as cemented carbide, glass, or a plastics material such as polytetrafluoroethylene, polyacetal resin (trade name "delrin" of Du Pont) or polypropylene. The use of a flexible smoother is undesirable because it may flex in the direction of movement of the web while smoothing the coated film as a result of which the thickness of the coated film would vary.

The web 4 is preferably transported at a speed of from 50 m/min to 300 m/min. However, as it is transported in close contact with the backing roll 7 and the doctor backing roll 8 under a continuous even tension, it will not flap nor shift in the widthwise direction.

The coating liquid 3 is supplied into the liquid pool at a predetermined shearing speed or higher from a liquid supplying sytem (not shown) and is discharged through the nozzle 2. The speed of the coating liquid 3 discharged through the nozzle will be hereinafter referred to as the "coating liquid discharge speed $V_0$". The speed $V_0$ is set to satisfy: $V_0 > 0.3$ m/sec, preferably $V_0 > 0.4$ m/sec, and more preferably $V_0 > 0.5$ m/sec. A discharge speed of $V_0 = 0.3$ m/sec is the minimum speed at which the coating liquid 3 will form into a film-shaped uniform jet. If the discharge speed $V_0$ is lower than 0.3 m/sec, it is impossible to form the film-shaped uniform jet. If the discharge speed $V_0$ is further decreased, it is impossible to form the film itself.

The coating liquid 3 discharged through the nozzle 2 strikes the moving web 4 at least a predetermined minimum speed. This minimum speed will hereinafter be referred to as "a coating liquid striking speed $V_1$". The striking speed $V_1$ is set to satisfy: 3 m/sec $> V_1 > 0.1$ m/sec, preferably 2.5 m/sec $> V_1 > 0.15$ m/sec, and more preferably 2 m/sec $> V_1 > 0.2$ m/sec. If the striking speed is lower than 0.1 m/sec, then the amount of air dragged in by the moving web 4 is increased and the coating liquid will splash. If the striking speed $V_1$ is made higher than 3 m/sec, the coating liquid will again splash. In both cases, a satisfactory coating operation cannot be achieved.

The striking speed $V_1$ is related to the discharge speed $V_0$ by: $3 > V_1/V_0$, preferably $2.5 > V_1/V_0$, and more preferably $2 > V_1/V_0$. The ratio $V_1/V_0$ will be referred to as the "elongation ratio" hereinafter. If the elongation ratio $V_1/V_0$ is larger than 3, the jet film will be broken and, accordingly, it is impossible to provide a uniform jet film.

In the coating device of the invention, in order to provide the necessary velocities of the coating liquid, that is the discharge speed $V_0$ and the striking speed $V_1$, a device for supplying the coating liquid under pressure such as a liquid supplying pump (not shown) is provided in the liquid supplying system which provides the desired velocity of the coating liquid.

The distance between the nozzle 2 and the surface of the web 4 will be referred to as the "nozzle setting distance d" hereinafter. The nozzle setting distance d is set to be most widely 15 cm $> d > 0.2$ cm, preferably 10 cm $> d > 0.3$ cm, and more preferably 5 cm $> d > 0.5$ cm. If the nozzle setting distance is set to less than 0.2 cm, it is difficult to coat the web with the coating liquid uniformly in the widthwise direction. In addition, foreign matter is liable to stick between the nozzle and the surface of the web causing the jet film to dry as a result of which the production yield is decreased. If, in contrast, the nozzle setting distance d is larger than 15 cm, then a so-called "contract vein phenomenon" occurs in which the edges in the widthwise direction of the jet film contract inwardly as a result of which both edges of the coated film have an irregular thickness. The occurrence of the contract vein phenomenon may be prevented by providing guide plates or edge guides along the edges of the jet film. Since the coating liquid 3 is thixotropic and condensable, foreign matter will form at the edge guides as the coating liquid 3 dries. Thus, the provision of the guide plates is not desirable.

A slit extends from the liquid pool 10 of the coating unit 1 to the tip of the nozzle 2. The width of the slit will be hereinafter referred to as the "nozzle port width s". The nozzle slit width s is set to a value within the range 2 mm $> s > 0.03$ mm. If the width s is greater than 2 mm, the amount of coating liquid supplied will be inordinately increased. Although the actual minimum value of the nozzle slit width s depends on machining accuracy, in practice it is preferable that it be at least 0.03 mm.

The thickness of the film formed by coating the web 4 with the coating liquid 3 under the above-described conditions is uniform in both the widthwise and lengthwise directions of the web 4. With the use of the invention it is possible to set the thickness of the film to a desired value.

In a case such as the manufacture of magnetic tape, a tolerance is specified on the thickness of a coated film and the film surface must smooth. Accordingly, the amount of coating liquid should be measured and the coated film smoothed. To accomplish this, in the coating device of this invention, a film is formed on the web 4 substantially to a predetermined thickness at the backing roll 7 and the film is smoothed to some degree by the smoother 11a. Thereafter, the thickness of the film determined by the doctor blade 9 and the coating is further smoothed by the smoother 11b. That is, the first smoothing operation is carried out before the actual step of thickness determination. With this technique, fine condensates of coating liquid formed on the coated film surface are broken which facilitates the succeeding thickness determining operation. As the second smoothing operation is carried out following the thickness determining operation, the fine condensates are further broken. As a result, the surface of the coated film is flat and lustrous over the entire width of the web.

The doctor backing roll 8 in the coating liquid measuring section is a metal roll having a mirror surface while the doctor blade 9 confronting the doctor backing roll 8 is made of a rigid material. The doctor blade 9 is arranged in the widthwise direction of the roll 8 in such a manner that the gap between the doctor blade 9 and the roll 8 is uniform. The doctor blade operates to scrape excess amounts of the high viscosity coating liquid from the web as it is transported at a high speed thereby determining the thickness of the coated film by determining the amount of coated liquid left on the web. For this purpose, it is essential that the doctor blade 9 be rigid. A device such as an air knife is not suitable for use as the doctor blade 9. It goes without saying that the coated film should be smoothed and its thickness determined before it has been solidified.

As is believed clear from the above description, the following advantageous effects are provided by the coating method of the invention:

(i) Even if the web is transported at a high speed of greater than 120 m/min, the tension on the web is maintained unchanged upstream and downstream of the backing rolls. Therefore, even an extremely thin web can be transported stably in close contact with the backing rolls.

(ii) The coating method of the invention, unlike the above-described reverse roll coating method, is completely free from the difficulty that the coating liquid sticks to the coating roll and splashes.

(iii) The coating liquid discharge speed $V_0$, the striking speed $V_1$ and the nozzle slit width d are set within the above-described ranges. Because of this, even when the web is run at a considerably high speed, it is possible to produce a coated film whose thickness is substantially equal to a desired value.

(iv) The provision of the coating liquid and the determination of the thickness of the coated film occur at different positions. Therefore, the coating section can determine the needed amount of coating liquid which is sufficient for improving the quality of the coated film and for stably coating the web.

As is clear from the above description, a web can be coated with a coating liquid at a high speed with the coated film produced thereby being of a high quality. This will become more apparent from the description of a specific example of a coating method of the invention which will be described below. The invention is not limited to the above-described embodiment. That is, it is evident that the invention can be variously modified within the scope and spirit of the invention.

With the invention, any thixotropic liquid having a sufficient viscosity of at least 2 poises can be employed as the coating liquid.

Figure 3:
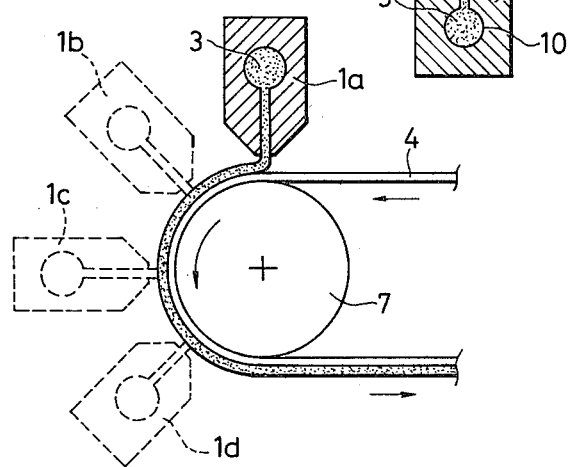
FIG. 3 is a sectional side view showing modifications of the coating device of the invention.

The direction of discharge of the coating liquid toward the web may be vertical as in the case of the coating unit 1a in FIG. 3, horizontal as in the case of a coating unit 1c, or oblique as in the cases of coating units 1b and 1d.

In the above-described embodiment, a smoothing operation is carried out both before and after the thickness of the film is determined. However, one or both of the smoothing operations may be eliminated if the required accuracy and configuration of the coated film surface do not need to be tightly controlled. Moreover, the thickness determining section may be omitted for the same reason. It is believed apparent from the description above that the designated parameter limitations and steps are essential for manufacturing a magnetic tape of very high quality because the coated film surface processing accuracy directly affects the electromagnetic conversion characteristics of the magnetic tape.

The above-described coating liquid discharge speed $V_0$ and striking speed $V_1$ are defined, respectively, by the following equations. This is also applicable to the speeds $V_0$ and $V_1$ in the specific example described below.

$V_0 = q/s$, where s is the nozzle slit width and q the coating liquid flow rate per nozzle slit width, and $V_1 = \sqrt{V_0^2 \pm 2\,gd}$, where g is the gravitational acceleration (9.8 m/sec$^2$) and d is the nozzle setting distance. In the second equation, the positive sign designates a downward discharge and the negative sign designates an upward discharge. These equations are derived from well-known principles of hydromechanics.

The advantageous effects of the invention will become more apparent from the following specific example.

EXAMPLE

Various components having compositions as indicated in the following Table 1 were mixed and dispersed in a ball mill to prepare a mixture. The mixture and 30 parts of epoxy resin (epoxy equivalent 500) were uniformly mixed and dispersed to prepare a magnetic coating liquid.

TABLE 1

| | |
|---|---|
| $\gamma$-Fe$_2$O$_3$ powder (needle-like particles having an average grain size 0.5 $\mu$ in the major axis direction, coercive force 320 Oe) | 300 parts by weight |
| Vinyl chloride - vinyl acetate copolymer (copolymerization ratio 87:13, polymerization degree 400) | 20 parts by weight |
| Electrically conductive carbon | 20 parts by weight |
| Polyamide resin (amine value 300) | 15 parts by weight |
| Lecithin | 6 parts by weight |
| Silicon oil (dimethylpolysiloxane) | 3 parts by weight |
| Xylole | 300 parts by weight |
| Methylisobutylketone | 300 parts by weight |
| n-butanol | 100 parts by weight |

The equilibrium viscosity of the magnetic coating liquid thus prepared was measured with a Shimazu Rheometer type RM-1 manufactured by the Shimazu Seisakusho Co. The equilibrium viscosity was 8 poises with a shearing speed of 100 sec$^{-1}$ and was 1 poise with a shearing speed of 500 sec$^{-1}$.

Polyethyleneterephthalate films were coated with the above-described magnetic coating liquid with the coating devices shown in FIGS. 2 and 3 under the conditions indicated in Table 2 below.

Experiment No. I was carried out to determine the stable coating aptitude of an extremely thin web while the primary purpose of Experiment No. II was to investigate the quality of coated film, especially its electromagnetic conversion characteristic, and Experiment III related to a determination of the high speed coating ability.

TABLE 2

| Conditions | Experiment No. | | |
|---|---|---|---|
| | I | II | III |
| Doctor gap ($\mu$) | 35 | 120 | 60 |
| Film thickness ($\mu$) right after coated | 240 | 190 | 180 |
| Support thickness ($\mu$) | 6 | 20 | 15 |
| Support width (mm) | 300 | 1000 | 1000 |
| Coating speed (web speed) (m/min) | 100 | 100 | 250 |
| Discharge direction | Vertically upward | Vertically downward | Vertically downward |
| Discharge speed $V_0$ (m/sec) | 0.8 | 0.4 | 1.5 |
| Striking speed $V_1$ (m/sec) | 0.76 | 0.8 | 2.05 |
| Elongation ratio $V_1/V_0$ | 0.95 | 2.0 | 1.4 |
| Nozzle slit width s (mm) | 0.5 | 0.8 | 0.5 |
| Nozzle setting distance d (cm) | 0.3 | 2.4 | 10 |
| Dried thickness of coated film ($\mu$) | 3 | 10 | 5 |

(i) In Experiment No. I, the support passed stably through the coating section, smoothing section and the measuring section. The thickness of the dried coated film was inspected. The variations of the thickness in the lengthwise and widthwise direction of the support were found to be less than ±5%. Thus, it has been proven that even an extremely thin web, having a thickness 6$\mu$, can be stably coated with coating liquid with the use of the invention.

(ii) In Experiment No. II, the variations in thickness of the coated film were less than ±5%, similar to Experiment No. I, and the coated film surface was quite smooth. The characteristics of the magnetic tape which was obtained upon drying the film-coated web and cutting it into a predetermined width were determined. As a result, it was found that the dropout of the magnetic tape was less than 1/10 that of magnetic tape manufactured according to the conventional reverse roll coating method.

(iii) In Experiment No. III, the coating speed was 2.5 times that in Experiment Nos. I and II. The coating ability of the magnetic coating liquid was checked and it was found that the variations in thickness of the coated film were slightly larger than that in Experiment No. I or II. However, the electromagnetic conversion characteristics thereof were still quite satisfactory. In summary, magnetic tape produced according to the invention is generally superior to that produced according to the conventional reverse roll coating method.

The above-described Experiment Nos. I, II and III satisfy the four conditions (a) through (d) set forth above. Experiments were further conducted using to the following ranges which do not meet the four conditions (a) through (d), (a') $0.3 \text{ m/sec} \leq V_0$
(b') $V_1 \leq 3 \text{ m/sec}$ and $0.1 \text{ m/sec} \leq 0.1$
(c') $V_1/V_0 \leq 3$
(d') $d \leq 15 \text{ cm}$ and $0.2 \text{ cm} \leq d$ As a result of the latter experiments, it was determined that undesirable defects resulted in the coated film of a nature as was described before.

Thus, it has been positively determined from the above-described experiments that the invention has the following merits:

(1) A web having a thickness even less than 10$\mu$ can be coated with a coating liquid.

(2) The coating operation can be carried out by discharging the coating liquid either vertically upward or vertically downward.

(3) The coating operation can be finely carried out with a high speed of 250 m/min as well as a low speed of 100 m/min.

(4) In all the cases (1), (2) and (3) above, the coating operation is stable at all times and the coated film is of excellent quality.

What is claimed is:

1. A method for coating a web comprising the steps of: continuously transporting a web to be coated past a nozzle in an extrusion-type coating unit; and discharging a magnetic coating liquid through said nozzle onto said web, wherein:
   (a) $V_0 > 0.3 \text{ m/sec}$,
   (b) $3 \text{ m/sec} > V_1 > 0.1 \text{ m/sec}$,
   (c) $3 > V_1/V_0$, and
   (d) $15 \text{ cm} > d > 0.2 \text{ cm}$
   where $V_0$ is the coating liquid discharge speed at said nozzle of said extrusion-type coating unit, $V_1$ is the coating liquid striking speed at the surface of said web, and d is the distance between said nozzle and said surface of said web.

2. The method as claimed in claim 1 further comprising the steps of: removing excessive amounts of coating liquid from the surface of said web at a position which is independent of a coating section and downstream of said coating section after said web has been coated with said coating liquid under conditions (a) through (d).

3. The method as claimed in claim 2 further comprising the steps of smoothing a film formed on said web by coating said web with said coating liquid at least once before or after said excessive amount of coating liquid is removed from said web.

4. The method of claim 1 wherein $V_0 > 0.4 \text{ m/sec}$.

5. The method of claim 1 wherein $V_0 > 0.5 \text{ m/sec}$.

6. The method of claim 1 wherein $2.5 > V_1/V_0$.

7. The method of claim 1 wherein $2 > V_1/V_0$.

8. The method of claim 1 wherein $2.5 \text{ m/sec} > V_1 > 0.15 \text{ m/sec}$.

9. The method of claim 1 wherein $2 \text{ m/sec} > V_1 > 0.2 \text{ m/sec}$.

10. The method of claim 1 wherein $10 \text{ cm} > d > 0.3 \text{ cm}$.

11. The method of claim 1 wherein $5 \text{ cm} > d > 0.5 \text{ cm}$.

12. The method of claim 1 wherein the slit width of said nozzle is within a range of 2 mm to 0.03 mm.

* * * * *